United States Patent
Sun et al.

(10) Patent No.: US 11,113,802 B1
(45) Date of Patent: Sep. 7, 2021

(54) PROGRESSIVE IMAGE FUSION

(71) Applicant: Apple Inc., Cupertino, CA (US)

(72) Inventors: Hao Sun, San Jose, CA (US); Giancarlo Todone, Mountain View, CA (US); Farhan A. Baqai, Fremont, CA (US); Gijesh Varghese, Milpitas, CA (US); Morten Poulsen, Palo Alto, CA (US)

(73) Assignee: Apple Inc., Cupertino, CA (US)

(\*) Notice: Subject to any disclaimer, the term of this patent is extended or adjusted under 35 U.S.C. 154(b) by 177 days.

(21) Appl. No.: 16/564,573

(22) Filed: Sep. 9, 2019

(51) Int. Cl.
*G06T 5/50* (2006.01)
*G06T 5/00* (2006.01)

(52) U.S. Cl.
CPC .............. *G06T 5/50* (2013.01); *G06T 5/009* (2013.01); *G06T 2207/20208* (2013.01); *G06T 2207/20221* (2013.01)

(58) Field of Classification Search
CPC . G06T 5/50; G06T 5/009; G06T 2207/20208; G06T 2207/20221
See application file for complete search history.

(56) References Cited

U.S. PATENT DOCUMENTS

| 2011/0147588 A1* | 6/2011 | Chaudhuri | G06T 5/50 250/334 |
| 2018/0352134 A1* | 12/2018 | Sun | H04N 5/23232 |
| 2019/0335077 A1* | 10/2019 | Rieveschl | H04N 5/23212 |

\* cited by examiner

*Primary Examiner* — Kim Y Vu
*Assistant Examiner* — Francisco A Agra
(74) *Attorney, Agent, or Firm* — Blank Rome LLP

(57) ABSTRACT

An adaptive approach to image bracket determination and a more memory-efficient approach to image fusion, which are designed to generate low noise and high dynamic range (HDR) images in a wide variety of capturing conditions, are described. An incoming preview image stream may be obtained from an image capture device. When a capture request is received, an analysis may be performed on an image from the preview image stream that has a predetermined temporal relationship to the image capture request. Based on the analysis, a set of images (and their respective capture parameters, e.g., exposure time) may be determined for the image capture device to capture. As the determined set of images are captured, they may be registered and fused in a memory-efficient manner that, e.g., places an upper limit on the overall memory footprint of the registration and fusion operations—regardless of how many images are captured in total.

20 Claims, 5 Drawing Sheets

PROGRESSIVE IMAGE FUSION

TECHNICAL FIELD

This disclosure relates generally to the field of digital image processing. More particularly, but not by way of limitation, it relates to techniques for an adaptive approach to image bracket determination and a more memory-efficient approach to image fusion, in order to generate low noise and high dynamic range (HDR) images in a wide variety of capturing conditions.

BACKGROUND

Fusing multiple images of the same captured scene is an effective way of increasing signal-to-noise ratio (SNR) in the resulting fused image. This is particularly important for small and/or thin form factor devices—such as mobile phones, tablets, laptops, wearables, etc.—for which the pixel size of the device's image sensor(s) is often quite small. The smaller pixel size means that there is comparatively less light captured per pixel (i.e., as compared to a full-sized, standalone camera having larger pixel sizes), resulting in more visible noise in captured images—especially in low-light situations.

In image fusion, one of the images to be fused may be designated as the "reference image." The other images that are to be part of the fusion operation may be designated as "candidate images," and the candidate images are registered to the reference image before the fusion operation. The decision of which image in a set of captured images should serve as the reference image may be based on, e.g., an image quality measure (such as sharpness, face quality, noise level, etc.), a capture timing measure (such as the image captured closest in time to a received capture request, e.g., if images are being captured in a streaming fashion), a device condition measurement (such as an image captured with the least amount of device rotation), or any other image condition or set of conditions desired by a given implementation.

A "distance measure" may then be used to determine if the pixels in the candidate images are sufficiently similar to the corresponding pixel in the reference image to be fused. If the distance measure between a given candidate pixel in a candidate image and the corresponding pixel in the reference image is below a distance threshold, e.g., a noise-dependent distance threshold, the candidate pixel is deemed similar, and it may be used to contribute to the fused result for that pixel.

Often, there can be significant capture time differences between the images that are to be fused, and, therefore, the image registration process may not be able to account for local motion within the images, camera shake, and/or rotation between captured images, etc. In these situations, the differences between corresponding pixels in the reference and candidate images may not just be noise—they may instead be differences caused by a failure of the image registration algorithm. For example, a region(s) of the reference image that changes over time across the captured images, e.g., due to object motion or registration errors, may create "ghosting artifacts" in the final fused image. The appearance and characteristics of ghosting artifacts may vary from image to image. For example, a section of the image that has a certain color in the reference image, but has different colors in the other candidate images will, when combined with the candidate images, result in a faded look or a false color region that is potentially noticeable by a viewer of the final fused image. On the other hand, an edge area or a textured area that moves over time across the captured images may, when fused, have visible multi-edges (e.g., double edges, triple edges, etc.), which may also be noticeable in the final fused image. Thus, in some embodiments, avoiding ghosting artifacts may be desirable when fusing multiple image frames for the purpose of noise reduction.

Despite these potential difficulties, in general, by fusing multiple images together, a better quality resultant image may be achieved than may be obtained from a single image capture. The multiple image captures used in a given fusion operation may comprise: multiple images captured with the same exposure (e.g., for the purposes of freezing motion), which will be referred to herein as Still Image Stabilization (SIS); multiple images captured with different exposures (e.g., for the purposes of highlight recovery, as in the case of HDR imaging); or a combination of multiple images captured with shorter and longer exposures, as may be captured when an image capture device's Optical Image Stabilization (OIS) system is engaged, e.g., for the purposes of estimating the moving pixels from the shorter exposures and estimating the static pixels from the long exposure(s). Moreover, the captured images to be fused can come from, e.g., the same camera, multiple cameras with different image sensor characteristics, or different processing workflows (such as video capture and still image capture).

In some prior art image fusion schemes, the type and/or number of bracketed exposures captured by an image capture device may be predetermined, e.g., determined before an image capture request is received from a user of the image capture device and without consideration of the lighting conditions or composition of the scene being captured. In such schemes, the predetermined set of bracketed exposures may have been determined a priori, e.g., in an attempt to capture the number (and types) of image resources that are typically able to achieve a satisfactory fusion result across a wide variety of image capture situations. However, such predeterminations may not be able to provide a satisfactory fusion result in certain lighting conditions and/or scene compositions (e.g., low-light scene conditions).

Further, certain low-light scene conditions may require a longer aggregate exposure time (i.e., the sum of the exposure times of all images that will be involved in the fusion operation) to capture than a user is typically used to. For example, such longer aggregate exposure times may be necessary in order for the image capture device(s) to be able to capture enough photons that a satisfactory signal-to-noise ratio may be reached in the resulting fused image. A user of the image capture device (or subject being photographed by the user) typically will not remain steady long enough for such longer aggregate exposure times to complete and capture usable image information (e.g., sufficiently sharp image information)—unless they are advised of such longer aggregate exposure times in advance of the image capture operations. Image fusion in such low-lighting conditions may also benefit from the capture of a larger number of images than the image capture device can hold in memory at one time, e.g., due to the aforementioned need for additional photons in low-lighting conditions, which may also present additional challenges in memory-limited, e.g., mobile, electronic image capture devices.

Thus, what is needed is an adaptive approach to image bracket determination, e.g., an approach that is tailored to the current lighting conditions and/or scene compositions, as well as a more memory-efficient approach to image fusion, in order to generate low noise and HDR images in a wide variety of image capturing conditions.

SUMMARY

Electronic devices, methods, and non-transitory program storage devices for performing an adaptive approach to image bracket determination and a more memory-efficient approach to image fusion are described herein. Such approaches are designed to generate low noise and high dynamic range images in a wide variety of image capturing conditions and do so in a memory-efficient manner. According to some embodiments, an incoming preview image stream may be obtained from an image capture device. When a capture request is received, an analysis may be performed on an image selected from the preview image stream that has a predetermined temporal relationship to the received image capture request (e.g., an image captured immediately before the image capture request was received, an image captured immediately after the image capture request was received, an image captured a predetermined number of frames before or after the image capture request, etc.). Based on the analysis, one or more capture parameters for each of a set of subsequent image capture operations for the one or more image capture devices may be determined, wherein the one or more capture parameters comprise a respective target exposure time value for a subsequent image capture operation. As the set of images are captured by the determined subsequent image capture operations, they may be registered and fused in a memory-efficient manner that, e.g., places an upper limit on the overall memory footprint of the registration and fusion operations—regardless of how many images are captured in the determined set.

According to some embodiments, the analysis of the image from the preview image stream may comprise analyzing, e.g.: a dynamic range; a scene motion value; or a signal-to-noise ratio value related to the image from the preview stream. In some embodiments, the process of performing adaptive image bracket determination may further comprise performing an additional downscaling operation on the image from the preview image stream before performing the analysis and/or generating an image histogram for the (optionally downscaled) image from the preview image stream to aid in the analysis.

According to some embodiments, a target SNR value may also be used to help determine the respective target exposure time values (and/or analog or digital gains) for the set of images that will be captured for the fusion operation. For example, according to some embodiments, the determined capture parameters for the subsequent images to be captured by the image capture device may be based on the analysis of the selected image from the preview image stream (and, optionally the target SNR value) and may comprise parameters specifying the subsequent capture of, e.g.: one or more EV0 images, one or more EV− images, and/or one or more long exposure (e.g., EV+) images. (Further explanations of these various types of images are provided below.) In some embodiments, the determined set of images to be subsequently captured may be comprised of two or more batches of repeating patterns of images, e.g., the determined capture parameters may specify the capture of a set of images comprising five consecutive subsets of one EV0 and one EV+ image, resulting in a final set of ten images comprising 5 EV0 images and 5 EV+ images. This image set composition is purely illustrative, and the compositions of determined image sets to be captured in various types of lighting conditions and/or scene compositions may be tailored based on the needs of a given implementation.

In some embodiments, the captured images may also comprise at least one image captured before the receiving of the capture request. In other embodiments, the captured images may all comprise images captured after the receiving of the capture request. In still other embodiments, the captured images may further comprise at least one image pair, wherein the images in the image pair are taken consecutively and, in some instances, with a very small delay between their captures, but with different exposure settings from one another. In some instances, a noise reduction process may also be performed, e.g., on one or more of the captured images, prior to the fusion operation. In other instances, noise reduction may be performed only on the resultant fused image. Adaptive approaches to image bracket determination, such as those disclosed herein, may allow for the advantages of highlight recovery, motion freezing, and low noise—which are typically only achieved at or above certain exposure levels—to be at least partially maintained in the resulting fused image throughout a wide variety of capturing conditions, including low-light conditions.

As mentioned above, in still other embodiments, the image fusion scheme itself may be designed to place an upper limit on the overall memory footprint of the registration and fusion operations—regardless of how many images are captured in the determined set of images. Such schemes may be referred to herein as "progressive" image fusion schemes. According to some progressive image fusion schemes, the overall fusion operation is broken down into a number of individual fusion operations on smaller sub-sets or "batches" of images that are captured in a temporal sequence. The results of the fusion operation on the smaller batch of images (along with one or more other images, as desired) may then be carried forward and used as one (or more) of the inputs to the fusion operation on the next captured batch of images. In this way, at least some amount of information from each of the captured images may be carried forward through the overall fusion operation, while limiting the necessary memory footprint of the fusion operation to the size of: one batch of images plus any images or fusion results carried forward from prior small batch fusion operations. In this manner, the progressive fusion techniques described herein can essentially carry on indefinitely, without exceeding the predetermined memory footprints of the scheme.

As mentioned above, various non-transitory program storage device embodiments are disclosed herein. Such program storage devices are readable by one or more processors. Instructions may be stored on the program storage devices for causing the one or more processors to: obtain an incoming preview image stream from one or more image capture devices; receive an image capture request from an electronic device; analyze and select, in response to the image capture request, at least a first image from the incoming preview image stream; determine, based, at least in part on the analysis of the selected at least first image, one or more capture parameters for each of a set of subsequent image capture operations for the one or more image capture devices, wherein the one or more capture parameters comprise a respective target exposure time value for a subsequent image capture operation; cause the performance of the subsequent image capture operations to capture, using the one or more image capture devices, a set of images, wherein each image in the set of images is captured using the one or more capture parameters determined for the respective image capture operation; register the captured set of images;

fuse the registered set of images to form a fused image; and store the fused image in a memory.

According to other embodiments, instructions may be stored on program storage devices for causing the one or more processors to: obtain a first batch of images captured by one or more image capture devices; select a reference image from the first batch of images and register one or more images from the first batch of images to the reference image; perform a first fusion operation on the registered first batch of images to output a first fused image; designate the first fused image as a current intermediate fusion image; successively perform a subsequent fusion sequence at least one time, wherein each subsequent fusion sequence comprises: obtaining a subsequent batch of images captured by the one or more image capture devices; registering one or more images of the subsequent batch of images to the reference image; performing a subsequent fusion operation on: the subsequent batch of images, the current intermediate fusion image, and the selected reference image to output an updated fused image; and designating the updated fused image as the current intermediate fusion image; and following completion of the last subsequent fusion sequence, store the current intermediate fusion image as an output fused image in a memory.

Various methods of performing adaptive image bracket determination and memory-efficient image fusion techniques are also disclosed herein, in accordance with the program storage device embodiments enumerated above. Various programmable electronic devices are disclosed herein as well, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various program storage device embodiments enumerated above.

DETAILED DESCRIPTION

Figure 1:
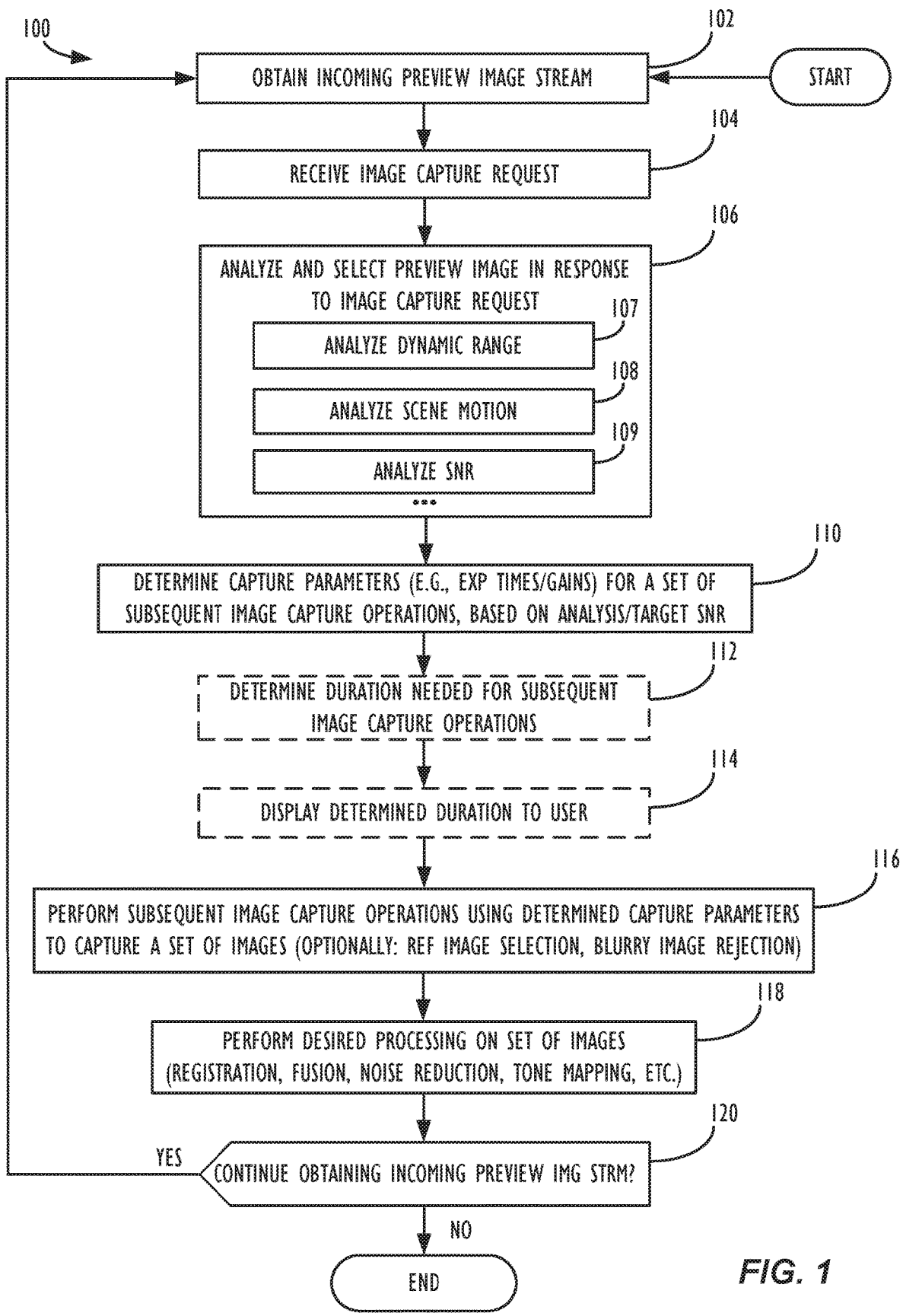
FIG. 1 is flow chart illustrating a method of adaptive image bracket determination and fusion, according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

Discussion will now turn to the nomenclature that will be used herein to refer to the various differently-exposed images that may be captured by an image capture device. As in conventional bracket notation, "EV" stands for exposure value and refers to a given exposure level for an image (which may be controlled by one or more settings of a device, such as an image capture device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV) given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

According to some embodiments, an incoming preview image stream, as discussed herein, may comprise a live stream of "preview" versions of the EV0 images captured by one or more image capture devices. An incoming preview image stream may be displayed directly on a display of an electronic device, e.g., when a user of the electronic device is operating the electronic device in an image capture mode that presents a live preview to the user. In some cases, the preview image stream may further comprise preview images that are downscaled versions of such EV0 images captured by the one or more image capture devices, such that the live displaying, processing, analyzing, and/or transporting of such preview images may be performed in a more memory- and processing-efficient manner.

The term "EV-" image refers to an underexposed image that is captured at a lower stop (e.g., 0.5, 1, 2, or 3 stops) than would be used to capture an EV0 image. For example, an "EV-1" image refers to an underexposed image that is captured at one stop below the exposure of the EV0 image, and "EV-2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

For example, according to some embodiments, an image stream captured by an image capture device may comprise a combination of: EV−, EV0, EV+, and/or long exposure images. It is further noted that the image stream may also comprise a combination of arbitrary exposures, as desired by a given implementation or operating condition, e.g., EV+2, EV+4, EV−3 images, etc.

According to some embodiments, long exposure images may comprise an image frame captured to be over-exposed relative to an EV0 exposure setting. In some instances, it may be a predetermined EV+ value (e.g., EV+1, EV+2, etc.). In other instances, the exposure settings for a given long exposure image may be calculated on-the-fly at capture time (e.g., within a predetermine range). A long exposure image may come from a single image captured from a single camera, or, in other instances, a long exposure image may be "synthesized" from multiple captured images that are fused together (which will be referred to herein as a "synthetic long exposure image"). In instances where the image capture device is capable of performing OIS, the OIS may be actively stabilizing the camera and/or image sensor during capture of the long exposure image and/or one or more of the other captured images. (In other embodiments, there may be no OIS stabilization employed during the capture of the other, i.e., non-long exposure images, or a different stabilization control technique may be employed for such non-long exposure images). In some instances, an image capture device may only use one type of long exposure image. In other instances, the image capture device may capture different types of long exposure images, e.g., depending on capture conditions. For example, in some embodiments, a synthetic long exposure image may be created when the image capture device does not or cannot perform OIS, while a single long exposure image may be captured when an OIS system is available and engaged at the image capture device. According to some embodiments, in order to recover a desired amount of shadow detail in the captured image, some degree of overexposure (e.g., EV+2) may intentionally be employed in bright scenes and scenes with medium brightness. Thus, in certain brighter ambient light level conditions, the long exposure image itself may also comprise an image that is overexposed one or more stops with respect to EV0 (e.g., EV+3, EV+2, EV+1, etc.). To keep brightness levels consistent across long exposure images, the gain may be decreased proportionally as the exposure time of the capture is increased, as, according to some embodiments, brightness may be defined as the product of gain and exposure time. According to some embodiments, even images captured as EV0 images may still be modified in one or more ways, as may be desired by a given implementation, e.g., in terms of gain and exposure time combinations.

In some embodiments, long exposure images may comprise images captured with greater than a minimum threshold exposure time, e.g., 50 milliseconds (ms) and less than a maximum threshold exposure time, e.g., 250 ms, 500 ms, or even 1 second. In other embodiments, long exposure images may comprise images captured with a comparatively longer exposure time than a corresponding normal or "short" exposure image for the image capture device, e.g., an exposure time that is 4 to 30 times longer than a short exposure image's exposure time. In still other embodiments, the particular exposure time (and/or system gain) of a long exposure image may be further based, at least in part, on ambient light levels around the image capture device(s), with brighter ambient conditions allowing for comparatively shorter long exposure image exposure times, and with darker ambient conditions allowing the use of comparatively longer long exposure image exposure times. In still other embodiments, the particular exposure time (and/or system gain) of a long exposure image may be further based, at least in part, on whether the image capture device is using an OIS system during the capture operation.

It is to be noted that the noise level in a given image may be estimated based, at least in part, on the system's gain level (with larger gains leading to larger noise levels). Therefore, in order to have low noise, an image capture system may desire to use small gains. However, as discussed above, the brightness of an image may be determined by the product of exposure time and gain. So, in order to maintain the image brightness, low gains are often compensated for with large exposure times. However, longer exposure times may result in motion blur, e.g., if the camera doesn't have an OIS system and/or if there is significant camera shake during the long exposure image capture. Thus, for cameras that have an OIS system, exposure times could range up to the maximum threshold exposure time in low light environments, which would allow for the use of a small gain—and hence less noise. However, for cameras that do not have an OIS systems, the use of very long exposure times will likely result in motion blurred images, which is often undesirable. Thus, as may now be understood, the long exposure image's exposure time may not always be the maximum threshold exposure time allowed by the image capture device.

According to some embodiments, the image stream captured by an image capture device may comprise a particular default sequence of exposures. For example, according to some embodiments, the sequence of incoming images may comprise: EV0, EV−, EV0, EV−, and so forth. In other embodiments, the default sequence of incoming images may comprise only EV0 images. In response to a received image capture request, according to some embodiments, it may be determined (e.g., based upon the aforementioned preview image analysis techniques) that the image capture device should capture a set of two or more images having particular target exposure values times (and/or gains) to use in an image fusion operation, which determined two or more images may include one (or more) long exposure images (or even one or more short exposure images) that are not a part of the image capture device's default sequence of exposures. After capturing the determined set of two or more image exposures, the image capture device may return to its default sequence of incoming image exposures, e.g., the aforementioned: EV0, EV−, EV0, EV− sequence. The sequence of exposures may, e.g., continue in this fashion until a subsequent image capture request is received, the camera(s) stop capturing images (e.g., when the user powers down the device or disables a camera application), and/or one when or more operating conditions may change.

Turning now to FIG. 1, a flow chart illustrating a method 100 of adaptive image bracket determination and fusion is illustrated, according to one or more embodiments. First, at Step 102, the method 100 may begin obtaining an incoming preview image stream, e.g., from one or more image capture devices of an electronic device. As mentioned above, preview images may comprise representations (e.g., downscaled representations) of images (e.g., EV0 images) being captured by one or more image capture devices of an electronic device in real-time. Preview images may be useful to provide a user of such an electronic device with a real-time estimate of what an image of the scene would look like if they were to indicate a desire for an image to be captured, e.g., in the form of a user selection of a physical shutter capture button or other user interface element indicating the user's desire to capture a still image. It is to be understood that preview images may not reflect the image capture device's full resolution capabilities, may not reflect and additional processing that may be performed on an actual captured image (e.g., image fusion resulting in increased dynamic range, noise reduction, tone mapping, cropping, etc.), and may not be stored to permanent or non-volatile memory of the electronic device.

Upon receipt of an image capture request (Step 104), e.g., via a user interface of an electronic device having one or more image capture devices, the process 100 may analyze and select a preview image from the incoming preview image stream that has a predetermined relationship (e.g., temporal relationship) to the received image capture request (Step 106). For example, according to some embodiments, the preview image that is analyzed may be the preview image that was captured immediately preceding the image capture request. In other embodiments, the preview image that is analyzed may be the preview image that was captured immediately following the image capture request. In still other embodiments, the preview image that is analyzed may be the preview image captured within a predetermined number of images before (or after) the image capture request that has a highest (or sufficiently high) image quality metric (e.g., sharpness, dynamic range, SNR, etc.), indicating that such preview image would be a good candidate to represent the true scene content at the moment the image capture request was received.

Once a preview image has been selected for analysis, the analysis may include, e.g., an analysis of the selected preview image's dynamic range (107), an analysis of an amount of scene motion estimated to be present in the selected preview images (108), and/or an analysis of the signal-to-noise ratio of the selected preview image (109). Other attributes of the selected preview image may also be analyzed, based on the needs of a given implementation. In some embodiments, determining the scene motion estimate may comprise transforming the preview image into a brightness-independent domain and computing an estimated motion value based on variations in local brightness levels. In this way, the obtained scene motion estimate may be more robust to exposure changes between captured images. In other embodiments, determining the scene motion estimate may comprise analyzing the amount of change in the image capture device's auto exposure parameters over a given period of time prior to the capture of the selected preview image.

It should also be noted that, in some embodiments, an option may be presented to a user of an electronic device, e.g., via a toggle switch as part of a user interface, allowing the user to specify whether or not the additional processing and analysis of method 100 are desired to be performed. If disabled, the electronic capture device may return to a default or standard image capture mode operation. In some embodiments, the option to specify whether or not the additional processing and analysis of method 100 is desired may only become available for scenes having estimated lux levels below a first threshold lux value. In still other embodiments, the option to perform the additional processing and analysis of method 100 is may be turned on by default for scenes having estimated lux levels below a second threshold lux value (wherein the second threshold lux level is lower than the first threshold lux level). It is to be understood that such schemes are left to the needs of a given implementation. For example, in other implementations, the process of method 100 may simply always be performed, or the option to perform method 100 may always be displayed to a user, regardless of scene lux levels, etc.

Based on the analysis performed at Step 106, the process 100 may determine capture parameters (e.g., target exposure time values and/or gain values) for each of a set of subsequent image capture operations to capture a set of images for the fusion operation (Step 110). According to some embodiments, the determination at Step 110 may be based, at least in part, on a target SNR that is desired to be achieved in the resultant fused image. According to other embodiments, the determination at Step 110 may also include a determination of which image to be captured should serve as the reference image for the fusion operation. In still other embodiments, the determination of reference image may not be made until after the respective determined images are captured and analyzed by the electronic device.

Next, at Step 112, the method 100 may optionally determine a duration needed to perform the determined subsequent image capture operations to capture the set of images, as determined at Step 110. For example, if Step 110 determines that 10 images are to be captured, each with a target exposure time value of 250 ms, then the total time duration for the capture of the determined set of images would be 10*250 ms, or 2.5 seconds. In some embodiments, at Step 114, this determined duration from Step 112 may optionally be displayed to a user, e.g., to provide the user with an indication of how long he or she should attempt to hold the image capture device steady (e.g., a countdown timer on a display of the electronic device) and/or inform a subject(s) being captured an indication of how long they should attempt to remain still for during the image capture process (assuming that a blurred output image is not desired).

As Step 116, the subsequent image capture operations are performed using the determined capture parameters to capture a set of images. According to some embodiments, various techniques may be employed to select which one of the captured images should serve as the reference image for the subsequent fusion operation. In some embodiments, the reference image may be chosen based on an exposure characteristic (e.g., using an EV– image as the reference image versus using an EV0 image as the reference image). In some embodiments, the reference image may be selected as the image captured closest in time to the image capture request received from the user. In other cases, if the image captured closest in time to the capture request is not of a high enough quality (e.g., in terms of sharpness, noise, brightness, face confidence, etc.), then a second closest in time image may be selected as the reference image. In other embodiments, the sharpest image may serve as the reference image. In some such embodiments, the sharpest image may be determined by calculating a sharpness value for each image that is to be considered for the fusion operation. The sharpness value may be based on information in the respective image's metadata, e.g., the image's auto-focus score, auto-exposure-related metadata, the device's positional data during the capture of the respective image, corner sharpness metrics tracked across multiple captured images, OIS system data, etc. In some embodiments, a regression operation may be performed to synthesize the various information analyzed for the image into a single sharpness value.

In some embodiments, images with below a threshold sharpness value may simply be discarded from subsequent fusion operations (or have their weight in the subsequent fusion operations decreased). If no image has greater than the threshold sharpness value, the device may determine that it is not possible to perform fusion operations for the given capture request. In other embodiments, the threshold sharpness value may be defined as a value that is more than a maximum sharpness threshold below the sharpness score of the selected reference image.

Next, at Step 118, any desired processing may be performed on any non-discarded captured images. For example, the captured images may be registered using any desired image registration method, e.g., global registration, local registration, dense optical flow, etc. As mentioned above, one of the selected images may be chosen to serve as the reference image of the registration process, and the other selected images may serve as the candidate images that are to be registered with the reference image. As will be described in greater detail below with reference to the progressive fusion schemes described in FIGS. 3A and 3B, according to some embodiments, the set of captured images may be broken up into a number of smaller sub-sets of images, which are each registered individually, thereby saving additional processing time.

Once the selected two or more images have been registered, they may be fused using any desired image fusion method. As will be described in greater detail below with reference to the progressive fusion schemes described in FIGS. 3A and 3B, according to some embodiments, the set of captured images may be broken up into a number of smaller sub-sets of images, which are each fused individually, with the fusion results of each sub-set being passed on, at least in part, to the next sub-set of images' fusion operation.

According to some embodiments, at Step 118, one or more tone mapping operations, e.g., global and/or local tone mapping operations may be performed on the image subsequently to the fusion operation. According to some embodiments, at Step 118, any desired noise reduction may also be applied to the fused image. (It is to be understood that, in some embodiments, the tone mapping and/or noise reduction steps may be optional.)

Finally, at Step 120, so long as the image capture device continues to obtain the incoming preview image stream (i.e., "YES" at Step 120), the process may return to Step 102 and continue operation. Once the image capture device has ceased to obtain the incoming preview image stream (i.e., "NO" at Step 120), e.g., in response to the user turning off the image capture device or closing the camera application, the process 100 may end.

In some embodiments, the same registration/fusion and/or noise reduction techniques may be applied, regardless of the makeup of the set of subsequent image capture operations determined at Step 110. It is to be understood that certain steps illustrated in FIG. 1 may be performed in a different sequence than is illustrated. For example, in some embodiments, noise reduction could be performed on each individual captured image before the registration and/or fusion operations.

Figure 2:
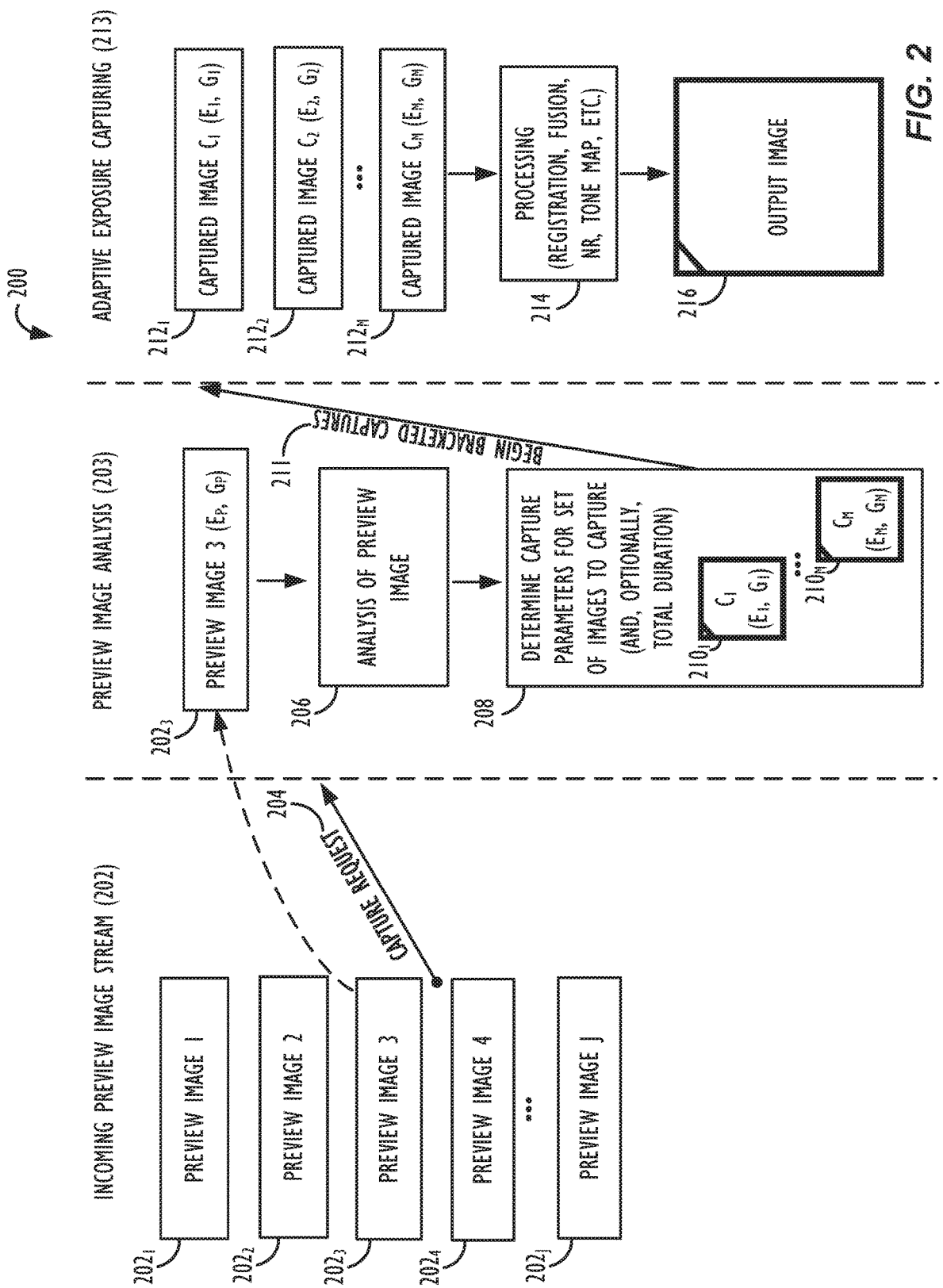
FIG. 2 illustrates an overview of a process for performing adaptive image bracket determination, according to one or more embodiments.

Referring now to FIG. 2, an overview of a process 200 for performing adaptive image bracket determination is illustrated, according to one or more embodiments. On the left-hand side of FIG. 2, the aforementioned incoming preview image stream 202 is illustrated. Incoming preview image stream 202 may, e.g., comprise a stream of preview images (illustrated as $202_1 \ldots 202_J$), which may be displayed on an electronic device, and which stream may be obtained continuously or until the relevant image capture device has been directed to cease obtaining the incoming preview image stream, e.g., in response to a user turning off the image capture device or closing the camera application. As mentioned above, in some embodiments, the preview images $202_1 \ldots 202_J$ may comprise images having a downscaled resolution from the resolution that an image sensor of the relevant image capture device is capable of capturing.

At some time during the obtaining of the incoming preview image stream, an image capture request 204 may be received, e.g., via a user interface. As illustrated in FIG. 2, image capture request 204 was received between the obtaining of preview image 3 ($202_3$) and preview image 4 ($202_4$). In response to receiving the capture request 204, at least a first image from the incoming preview image stream 202 may be selected for further analysis, wherein the at least first image has a predetermined temporal relationship to the received image capture request. For example, according to some embodiments, the preview image selected for further analysis may be the preview image immediately preceding the capture request 204, i.e., preview image 3 ($202_3$), in the example illustrated in FIG. 2. According to other embodiments, a different criterion (e.g., an image quality-based criterion and/or an image quality-based criterion in combination with a temporal correspondence-based criterion) may be applied to select the preview image for further analysis. In some embodiments, a preview image may be further downscaled before being analyzed, based on the needs of a given implementation.

Next, moving to the central portion of FIG. 2, the selected incoming preview image, i.e., preview image 3 ($202_3$) in the example illustrated in FIG. 2, is further analyzed (203). According to some embodiments, the exposure time value ($E_p$) and gain value ($G_p$) used for the capture of the selected preview image ($202_3$) will be utilized in the subsequent analysis (206) and/or determination (208) of the set of subsequent image capture operations. As mentioned above, various characteristics of the selected preview image may be analyzed and used in the determination (208) of the capture parameters (e.g., exposure time, gain, etc.) for the set of images that are to be captured, e.g., the selected preview image's dynamic range, an estimated amount of scene motion in the selected preview images, and/or the signal-to-noise ratio of the selected preview image.

In some embodiments, the determination (208) of the capture parameters for the set of images that are to be captured may comprise selecting a set of images from a group of predetermined sets of images having respective predetermined capture parameters, e.g., based on the result of the analysis performed at 206. For example, if a given embodiment has opted to take sets of 5 images for its fusion operations, then the group of predetermined sets of images for that embodiment may have three different predetermined sets of images having different predetermined capture parameters, such as: 1.) $\{E_p, E_p, E_p, E_p, E_p\}$; 2.) $\{E_p, E_p+1, E_p+2, E_p+1, E_p\}$; and 3.) $\{E_p+2, E_p+2, E_p+2, E_p+2, E_p+2\}$, wherein the notation $E_p$ refers to capturing an image with the same exposure time value as the selected preview image, $E_p+1$ refers to capturing an image at one stop above the exposure time value of the selected preview image, $E_p+2$ refers to capturing an image at two stops above the exposure time value of the selected preview image, $E_p-1$ would refer to capturing an image at one stop below the exposure time value of the selected preview image, and so forth.

As may now be understood, this scheme is both relative and adaptive, in that the target exposure time values may be determined with reference to the exposure time value for the selected preview image, which may, e.g., be quite short in brightly-lit scene conditions or be quite lengthy in low lighting conditions. In some embodiments, the analog gain of the relatively longer exposure images (e.g., $E_p+1$, $E_p+2$, $E_p+3$, etc.) may be intentionally decreased, especially in low-lighting conditions, such that some dynamic range of the scene may potentially be recovered, with less chance of signal clipping due to the relatively longer exposure times.

As mentioned above, the determination (208) of the capture parameters for the set of images that are to be captured may be based, at least in part, on the result of the analysis performed at 206. For example, if the SNR of the selected preview image indicates a large amount of noise present in the scene, then a predetermined set of images having a greater number of longer exposure images (e.g., the $\{E_p+2, E_p+2, E_p+2, E_p+2, E_p+2\}$ example given above) may be determined for the subsequent image capture operations, whereas, if the scene motion analysis performed on the selected preview indicates a large amount of motion present in the scene, then a predetermined set of images having a greater number of shorter exposure images (e.g., the $\{E_p, E_p, E_p, E_p, E_p\}$ example given above) may be determined for the subsequent image capture operations.

In some embodiments, a target SNR value may also be established for the image fusion operation. The target SNR value may represent a signal-to-noise ratio that it is desirable to achieve in the resultant fused image. Based on the target SNR, the process may be able to determine a priori, i.e., prior to beginning to capture the actual images that will be used in the fusion operation, how many and/or what types of image brackets (e.g., in terms of their capture parameters) will need to be captured in order to achieve (or come close to achieving) the target SNR in the resultant fused image. By determining the number and types of images that will be captured for the fusion operation, the process may also determine a total duration for the capture, which, as described above with reference to Steps 112 and 114, may be displayed to a user of the electronic device prior to beginning the image capture operation, if desired.

In some embodiments, the estimated SNRs of the images that are to be captured with different exposure time values than the selected preview image may be calculated according the following exemplary equation:

$$SNR_{Estimated} = \sum_p \frac{c^2 x_p^2}{acx_p + b}, \qquad \text{(Eqn. 1)}$$

wherein p represents the pixels in the selected preview image (which are summed over), $x_p$ represents the intensities of the respective pixels in the selected preview image, a is a tunable noise model parameter (e.g., related to shot noise), b is another tunable noise model parameter (e.g., related to read noise), and c is the ratio of the target exposure time value of the image that is to be captured to that of the preview image (e.g., if the SNR is being estimated for an $E_p+2$ image, the value of c would be 4 (i.e., 2 raised to the power of the additional number of stops, here, 2); if the SNR is being estimated for an $E_p+3$ image, the value of c would be 8 (i.e., 2 raised to the power of the additional number of stops, here, 3), etc.).

By estimating the SNRs of images to be taken with different target exposure time values, the process may then select a predetermined set of images (or determine a customized set of images and their respective exposure times on-the-fly) that would achieve (or come close to achieving) the target SNR in the resultant fused image. The determined sets of capture parameters for the set of images to be subsequently captured are illustrated in FIG. 2 as determined images $210_1 \ldots 210_M$. As illustrated, each of the M images 210 that the process has determined are to be captured may have a respective determined exposure time ($E_M$) and/or gain level ($G_M$), at which they are to be captured. Once the capture parameters for the set of images (and, optionally, the total time duration it will take to capture the set of images) has been determined, the process may proceed (211) to begin capturing the determined bracketed image captures.

Turning now to the right-hand side of FIG. 2, the adaptively determined bracketed images may be captured (213). As illustrated, the set of M captured images $212_1 \ldots 212_M$ will each have its respective determined target exposure time ($E_M$) and/or gain level ($G_M$). At block 214, the desired processing may be performed on the set of M captured images $212_1 \ldots 212_M$, e.g., as described above with reference to Step 118. For example, the captured images may be registered, fused, noise reduced, tone mapped, cropped, etc., according to any desired methodology.

As will be described in greater detail below with reference to the progressive fusion schemes described in FIGS. 3A and 3B, according to some embodiments, the set of captured images $212_1 \ldots 212_M$ may be broken up into a number of smaller sub-sets of images, which may be processed (e.g., registered, fused, noise reduced, tone mapped, cropped, etc.) as individual sub-sets, with the results of such processing on each sub-set being passed on, at least in part, to the next sub-set of images. In other words, in some instances, a portion of the captured images may be processed (e.g., registered, fused, noise reduced, tone mapped, cropped, etc.) before the entire set of images $212_1 \ldots 212_M$ have all been captured. Finally, at block 216, the fused output image is generated and optionally stored to memory, e.g., on the electronic device or at some other storage location.

Figure 3A:
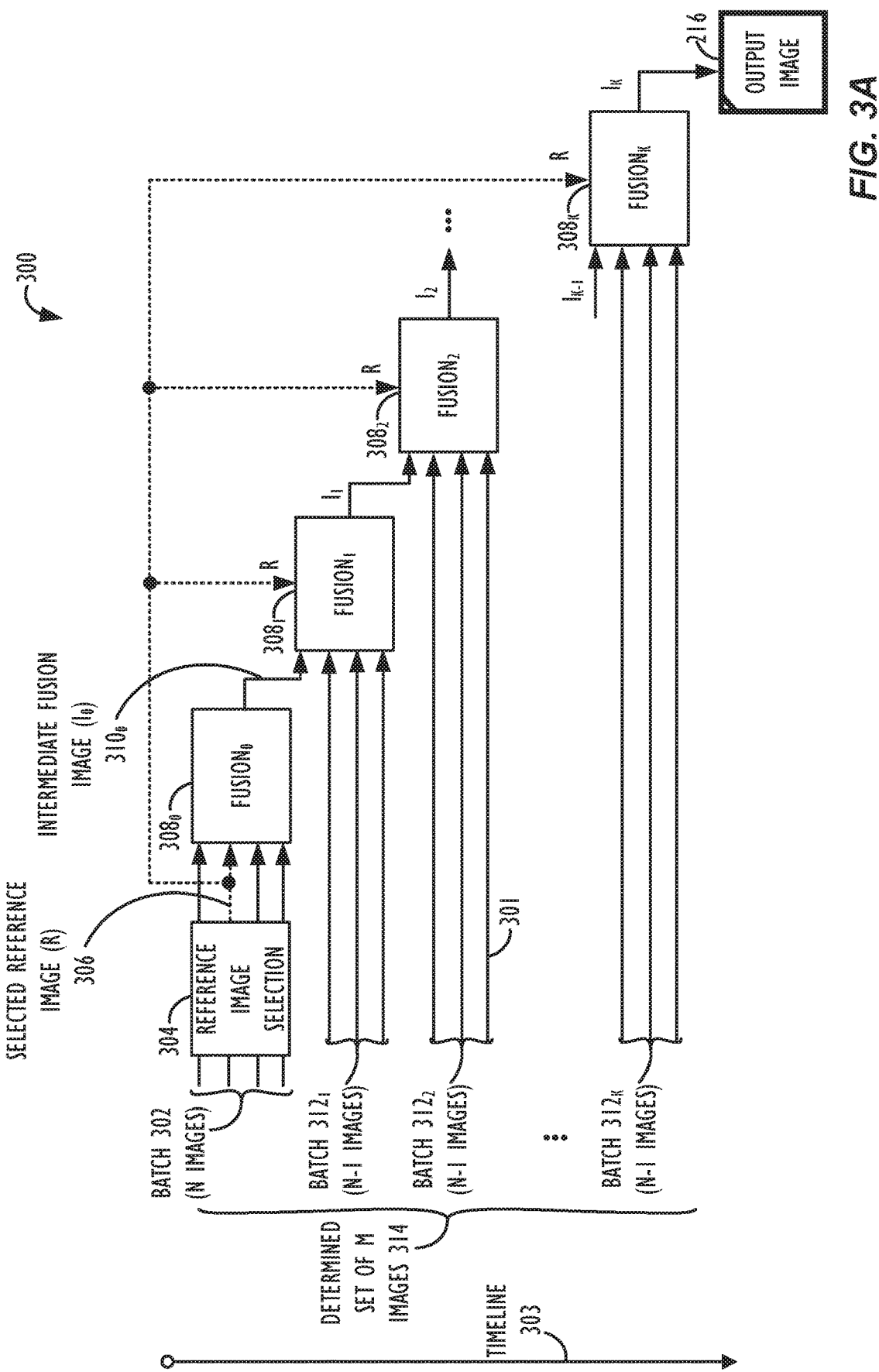
FIG. 3A illustrates an overview of a process for performing memory-efficient image fusion operations, according to one or more embodiments.

Referring now to FIG. 3A, an overview of a process 300 for performing memory-efficient image fusion operations is illustrated, according to one or more embodiments. Each horizontal arrow 301 in FIG. 3A represents an image that is captured by an image capture device of an electronic device, and timeline 303 represents the fact that images illustrated further down on the page were captured at a later moment in time than images captured above them on the page.

As discussed above with reference to FIG. 2, capture parameters for a set of images $210_1 \ldots 210_M$ to be captured may have been determined, e.g., based on an analysis of one or more preview images from an incoming preview image stream. This determined set of M images is illustrated at element 314 in FIG. 3A. As shown in FIG. 3A, to improve performance and memory efficiency, the determined set of M images may be broken down into two or more sub-sets or batches of images. In some embodiments, this may comprise a first batch of N images (302) and K additional subsequent batches of images ($312_1 \ldots 312_K$). In some implementations, e.g., for performance reasons, the subsequent batches of images 312 may comprise one fewer image (i.e. N–1 images) than the first batch of images 302, though such a choice is not strictly necessary.

Once the first batch of images 302 has been captured, a reference image selection operation (304) may be performed on the images in batch 302. As described above, various image-based metrics of the images in the first batch of images 302 may be analyzed to determine which image will serve as the selected reference image (R) 306. In the example of FIG. 3A, the second image captured in the first batch of four images 302 has been designated as the reference image. The selection of a high-quality reference image may help to improve the overall quality of the image fusion process 300, because, as will be explained below, according to some embodiments, the reference image may be carried forward into each iteration of the progressive image fusion scheme.

At block $308_0$, the first fusion operation may be performed on the first batch of images 302. The output of this first fusion operation, $310_0$, will be referred to herein as an intermediate fusion image, and designated as ($I_0$). This intermediate fusion image, $I_0$ ($310_0$), may then be carried forward as an input, along with reference image (R) 306, to the next subsequent fusion operation, shown at block $308_1$, which fusion operation $308_1$ may then be performed using: the first subsequent batch of images, $312_1$; intermediate fusion image, $I_0$ ($310_0$), and reference image (R) 306. The intermediate fusion image generated by each subsequent fusion operation may be designated and/or referred to herein as the "current" intermediate fusion image, i.e., it is the current intermediate fusion image until it is replaced by the intermediate fusion image generated by the next subsequent fusion operation.

This iterative process may then continue indefinitely, until a user indicates a desire to stop or cancel the image capture operation, or until the determined set of M images 314 have all been captured, with each subsequently-generated current intermediate fusion image, $I_K$ carried forward, along with reference image (R) 306, to the fusion operation for the next batch of captured images 312, until the process 300 terminates. Upon termination, the final current intermediate fusion image, $I_K$, may be used and/or stored as the output fused image 216, subject to any desired post-processing or tuning performed on the fused output fused image 216.

Figure 3B:
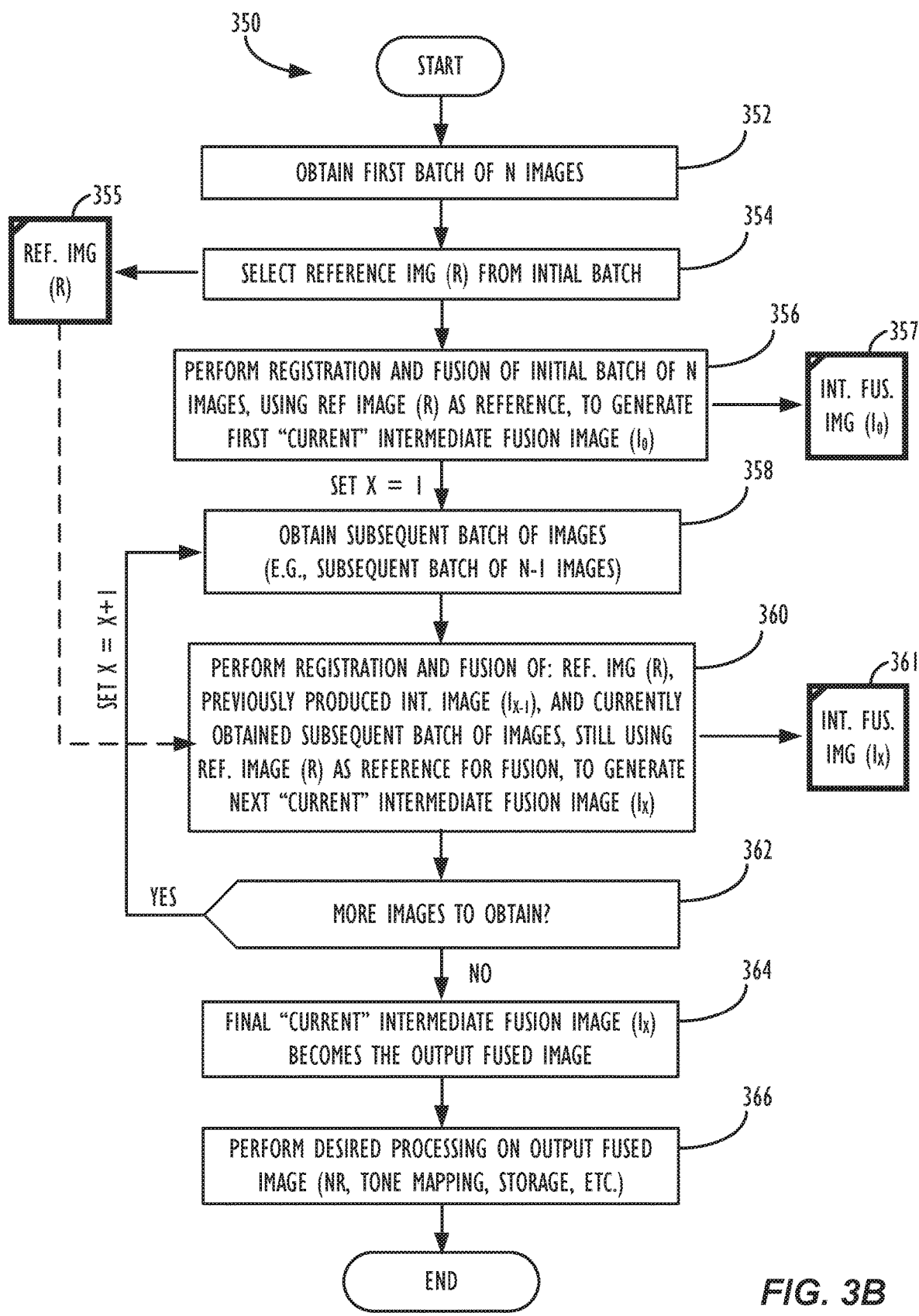
FIG. 3B is flow chart illustrating a method of performing memory-efficient image fusion operations, according to one or more embodiments.

Referring now to FIG. 3B, a flow chart illustrating a method 350 of performing memory-efficient image fusion operations is illustrated, according to one or more embodiments. First, at Step 352, a first batch of N images may be obtained. The N images may represent a subset of a total set of M images that have been determined to be captured for a given image capture request (e.g., the determined set of images $210_1 \ldots 210_M$ discussed above with reference to FIG. 2). The size of the first batch of images, N, may also be determined based, at least in part, on the amount of storage space available to hold captured images in memory on an electronic device during a real-time, e.g., progressive fusion operation.

Next, at Step 354, a reference image, R (355), may be selected form the first batch of N images. As described above, various characteristic and/or metrics related to the first batch of N images may be evaluated in making the determination of which image to select as the reference image, R, for the progressive fusion operation. Next, at Step 356, registration and fusion operations may be performed on the first batch of N images, wherein the reference image, R (355), is used as the reference image for a registration operation to be performed prior to the fusion operation, and wherein the result of the fusion operation of Step 356 comprises the first "current" intermediate fusion image, $I_0$ (357). As stated above, the most-recently generated intermediate fusion image will also be referred to herein as the "current" intermediate fusion image, i.e., it is the fusion result for the current iteration of the progressive fusion operation 350.

Next, a loop variable, x, may be initialized, e.g., with a value of 1, and then used to track the intermediate fusion images generated by the iterations of the subsequent fusion sequence comprising Steps 358 and 360, which will now be described in greater detail. At Step 358, the process 350 may obtain a subsequent batch of images. In some embodiments, each subsequent batch of images may contain fewer images (e.g., one less image, or N−1 images) than the first batch of N images obtained at Step 352. As will be explained below, this may enable the method to carry forward one or more images and/or fusion results from earlier iterations or earlier steps in the process 350 to subsequent fusion operations— without exceeding any memory limitations of the relevant electronic processing device performing method 350. However, if desired, other implementations may utilize subsequent batches of images having the same (or a larger) number of images as the first batch of images obtained at Step 352, as well.

At Step 360, a subsequent fusion operation may be performed on: the subsequent batch of images (which may, as described above, contain, N−1 images); the originally selected reference image, R (355); and the current intermediate fusion image (i.e., from the previous iteration of the loop comprising Steps 358 and 360), $I_{x-1}$. The reference image, R (355), may again be used as the reference image for a registration operation to be performed prior to the subsequent fusion operation, and the result of the fusion operation of Step 360 comprises an updated fused image, which will be designated as the new "current" intermediate fusion image, $I_x$ (361), and which, as described above, may be carried forward as one of the inputs to the next iteration of the subsequent fusion sequence comprising Steps 358 and 360.

According to some embodiments, a first fusion weight may be applied to the reference image, R (355), in the first fusion operation (i.e., Step 356) and in each subsequent fusion operation (Step 360). In other embodiments, the weight applied to the reference image, R (355), in each fusion operation may increase (or decrease) over time, e.g., based on how far apart, temporally, the reference image, R (355), was captured from the images in the particular subsequent batch of images being fused at Step 360, or any other desired image-based criterion.

At Step 362, an evaluation may be made as to whether there are still more images to obtain, e.g., whether the determined set of M images that are to be captured for a given image capture request (e.g., the determined set of images $210_1 \ldots 210_M$ discussed above with reference to FIG. 2) have all been captured. If there are more images to obtain (or no indication to stop obtaining subsequent batches of images has otherwise been received), i.e., "YES" at Step 362, the process may increment the loop variable, x, and return to Step 358 to begin the next iteration of the subsequent fusion sequence comprising Steps 358 and 360 by capturing the next subsequent batch of images. If, instead, all determined images have been obtained (or an indication to stop obtaining subsequent batches of images has otherwise been received), i.e., "NO" at Step 362, the process may proceed to Step 364.

At Step 364, i.e., following the completion of the last subsequent fusion sequence, the current intermediate fusion image, $I_X$ (361), from the final iteration of the loop comprising Steps 358 and 360 may become the output fused image for the fusion operation of method 350. As may now be appreciated, no matter how many images, M, are captured in total to contribute to the fusion operation, the number of images that need to be held in memory at any one time never exceed the number of images involved in the subsequent fusion operation at Step 360, e.g., a reference image, an intermediate fusion image from the previous loop iteration, and the number of images that are in a subsequently captured batch of images (e.g., N−1). This scheme essentially allows for the capture of images (whose information may contribute to a fusion operation) to be carried on indefinitely—and without exceeding memory limitations of the relevant electronic device.

Finally, at Step 366, any desired post-processing (e.g., noise reduction, tone mapping, cropping, etc.) may be performed on the output fused image, which may also include storing the output fused image to memory, e.g., on the electronic device or at some other storage location, and then the method 350 may terminate.

Figure 4:
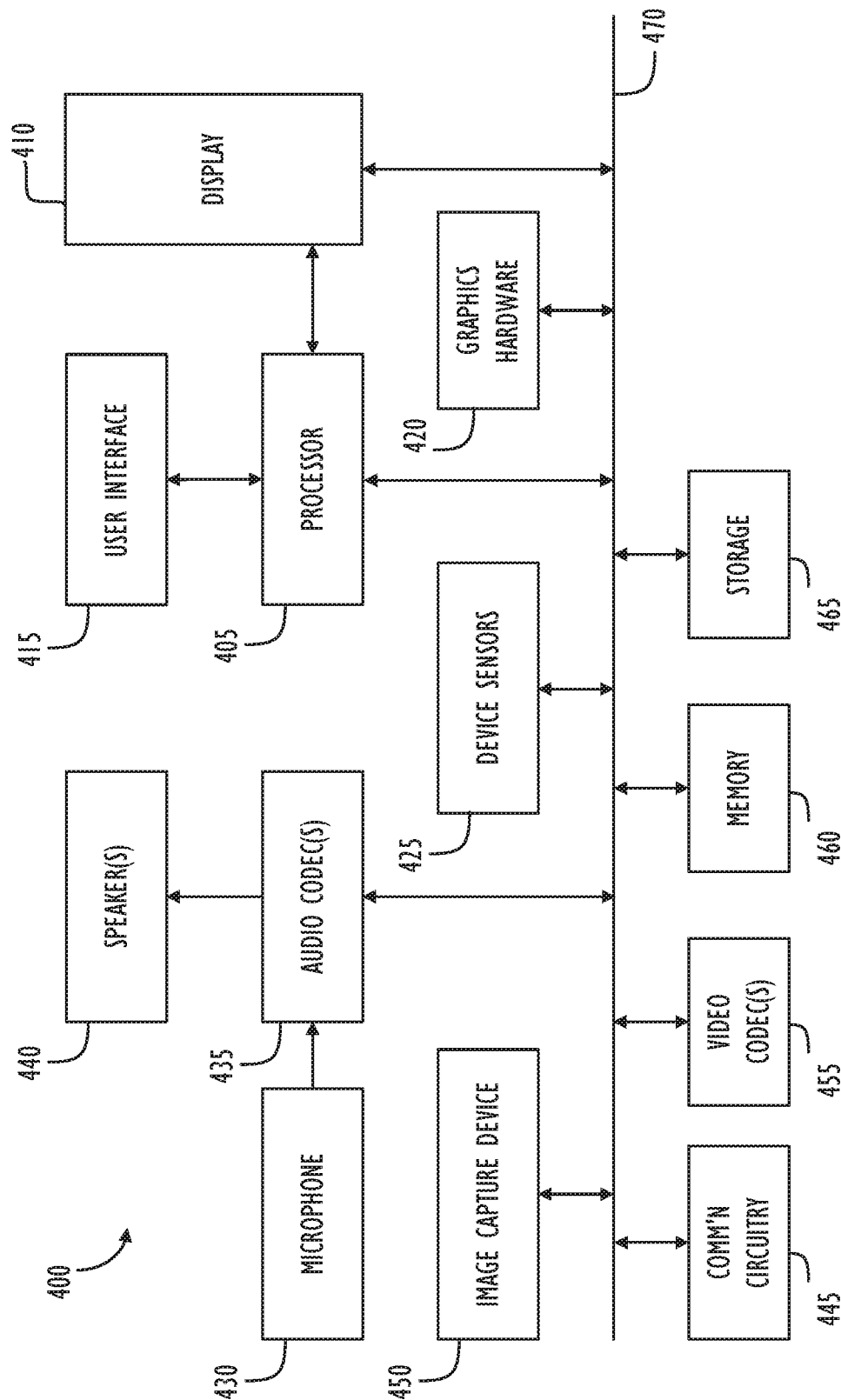
FIG. 4 is a block diagram illustrating a programmable electronic computing device, in which one or more of the techniques disclosed herein may be implemented.

Referring now to FIG. 4, a simplified functional block diagram of illustrative programmable electronic computing device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture device 450, which may, e.g., comprise multiple camera units/optical image sensors having different characteristics or abilities (e.g., SIS, HDR, OIS systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular image(s) that the user would like to capture (e.g., by clicking on a physical or virtual button at the moment the desired image is being displayed on the device's display screen). In one embodiment, display 410 may display a live image preview stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture device 450 may comprise one or more camera units configured to capture images, e.g., images which may be processed to generate fused versions of said captured images, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   one or more image capture devices;
   a display;
   a user interface; and
   one or more processors operatively coupled to the memory, wherein the one or more processors are configured to execute instructions causing the one or more processors to:
   obtain a first batch of images captured by the one or more image capture devices;
   select a reference image from the first batch of images and register one or more images of the first batch of images to the reference image;
   perform a first fusion operation on the registered first batch of images to output a first fused image;
   designate the first fused image as a current intermediate fusion image;
   successively perform a subsequent fusion sequence at least one time, wherein each subsequent fusion sequence comprises:
   obtaining a subsequent batch of images captured by the one or more image capture devices;
   registering one or more images of the subsequent batch of images to the reference image;
   performing a subsequent fusion operation on: the subsequent batch of images, the current intermediate fusion image, and the selected reference image to output an updated fused image; and designating the updated fused image as the current intermediate fusion image; and following completion of the last subsequent fusion sequence, store the current intermediate fusion image as an output fused image in the memory.

2. The device of claim 1, wherein the first batch of images and each subsequent batch of images comprise images with two or more different exposure values.

3. The device of claim 1, wherein the first batch of images has more images than each subsequent batch of images.

4. The device of claim 1, wherein a first fusion weight is applied to the selected reference image in the first fusion operation and in each subsequent fusion operation.

5. The device of claim 1, wherein the instructions to select the reference image from the first batch of images further comprise instructions to select the reference image based, at least in part, on a sharpness value determined for the selected reference image.

6. The device of claim 1, wherein the instructions further comprise instructions causing the one or more processors to:

discard at least one image from the first fusion operation based, at least in part, on a sharpness value determined for the at least one image being below a threshold sharpness value.

7. The device of claim 1, wherein the instructions further comprise instructions causing the one or more processors to:

discard at least one image from a subsequent fusion operation based, at least in part, on a sharpness value determined for the at least one image being below a threshold sharpness value.

8. A non-transitory program storage device comprising instructions stored thereon to cause one or more processors to:

obtain a first batch of images captured by one or more image capture devices;

select a reference image from the first batch of images and register one or more images from the first batch of images to the reference image;

perform a first fusion operation on the registered first batch of images to output a first fused image;

designate the first fused image as a current intermediate fusion image;

successively perform a subsequent fusion sequence at least one time, wherein each subsequent fusion sequence comprises:

obtaining a subsequent batch of images captured by the one or more image capture devices;

registering one or more images of the subsequent batch of images to the reference image;

performing a subsequent fusion operation on: the subsequent batch of images, the current intermediate fusion image, and the selected reference image to output an updated fused image; and designating the updated fused image as the current intermediate fusion image; and following completion of the last subsequent fusion sequence, store the current intermediate fusion image as an output fused image in a memory.

9. The non-transitory program storage device of claim 8, wherein the first batch of images and each subsequent batch of images comprise images with two or more different exposure values.

10. The non-transitory program storage device of claim 8, wherein the first batch of images has more images than each subsequent batch of images.

11. The non-transitory program storage device of claim 8, wherein a first fusion weight is applied to the selected reference image in the first fusion operation and in each subsequent fusion operation.

12. The non-transitory program storage device of claim 8, wherein the instructions to select the reference image from the first batch of images further comprise instructions to select the reference image based, at least in part, on a sharpness value determined for the selected reference image.

13. The non-transitory program storage device of claim 8, wherein the instructions further comprise instructions causing the one or more processors to:

discard at least one image from the first fusion operation based, at least in part, on a sharpness value determined for the at least one image being below a threshold sharpness value.

14. The non-transitory program storage device of claim 8, wherein the instructions further comprise instructions causing the one or more processors to:

discard at least one image from a subsequent fusion operation based, at least in part, on a sharpness value determined for the at least one image being below a threshold sharpness value.

15. A method, comprising:

obtaining a first batch of images captured by one or more image capture devices;

selecting a reference image from the first batch of images and registering one or more images of the first batch of images to the reference image;

performing a first fusion operation on the registered first batch of images to output a first fused image;

designating the first fused image as a current intermediate fusion image;

successively performing a subsequent fusion sequence at least one time, wherein each subsequent fusion sequence comprises:

obtaining a subsequent batch of images captured by the one or more image capture devices;

registering one or more images of the subsequent batch of images to the reference image;

performing a subsequent fusion operation on: the subsequent batch of images, the current intermediate fusion image, and the selected reference image to output an updated fused image; and designating the updated fused image as the current intermediate fusion image; and following completion of the last subsequent fusion sequence, storing the current intermediate fusion image as an output fused image in a memory.

16. The method of claim 15, wherein the first batch of images and each subsequent batch of images comprise images with two or more different exposure values.

17. The method of claim 15, wherein a first fusion weight is applied to the selected reference image in the first fusion operation and in each subsequent fusion operation.

18. The method of claim 15, wherein selecting the reference image from the first batch of images further comprises:

selecting the reference image based, at least in part, on a sharpness value determined for the selected reference image.

19. The method of claim 15, further comprising:

discarding at least one image from the first fusion operation based, at least in part, on a sharpness value determined for the at least one image being below a threshold sharpness value.

20. The method of claim 15, further comprising:
discarding at least one image from a subsequent fusion operation based, at least in part, on a sharpness value determined for the at least one image being below a threshold sharpness value.

\* \* \* \* \*